(12) United States Patent
Schmidt et al.

(10) Patent No.: US 6,368,685 B1
(45) Date of Patent: Apr. 9, 2002

(54) BASE PLATE WITH UNDULATION SHAPED SNAP-THROUGH HUB FOR DECREASED SWAGE FORCE ATTACHMENT OF SUSPENSION ASSEMBLY IN HARD DISK DRIVE

(75) Inventors: Ryan Schmidt; Kevin Hanrahan, both of Santa Barbara, CA (US)

(73) Assignee: Intri-Plex Technologies, Inc., Santa Barbara, CA (US)

( * ) Notice: Subject to any disclaimer, the term of this patent is extended or adjusted under 35 U.S.C. 154(b) by 0 days.

(21) Appl. No.: 09/591,895

(22) Filed: Jun. 12, 2000

Related U.S. Application Data

(63) Continuation of application No. 09/030,598, filed on Feb. 25, 1998, now abandoned.

(51) Int. Cl.[7] .......................... B29D 22/00; B32B 3/10; B32B 7/00; G11B 5/49; F16B 19/10
(52) U.S. Cl. ...................... 428/34.1; 428/133; 428/119; 306/104; 29/523
(58) Field of Search ............................. 428/34.1, 119, 428/131, 132, 133; 360/244.5, 244.6, 104, 106; 29/507, 522.1, 523, 603.03, 603.04

(56) References Cited

U.S. PATENT DOCUMENTS

| | | | | |
|---|---|---|---|---|
| 5,172,286 A | * | 12/1992 | Jurgenson | 360/104 |
| 5,363,262 A | * | 11/1994 | Drennan | 360/106 |
| 5,444,587 A | * | 8/1995 | Johnson et al. | 360/104 |
| 5,717,545 A | * | 2/1998 | Brooks, Jr. et al. | 360/104 |

* cited by examiner

Primary Examiner—Rena L. Dye
Assistant Examiner—Michael C. Miggins
(74) Attorney, Agent, or Firm—Owen L. Lamb

(57) ABSTRACT

A base plate for swage fitting into a boss hole of a predetermined nominal diameter. The base plate has a flange and a hub extending from a region at which the hub meets the flange to an outer end of the hub. The hub has a number of arcuate indentations in the hub extending from the outer end of the hub part way or all the way to the region at which the hub meets the flange. During a swaging operation the indentations amplify the expansion forces from the swage tool to engage the boss hole and can achieve snap-through shape change for permanent locking. For a press-in fit the diameter of the hub is greater than the nominal diameter. During a press-in operation a tool is inserted between the actuator arms and in alignment with the base plates. The tool is then activated a reach sufficient to urge each base plate hub into a corresponding boss hole for a press fit.

14 Claims, 2 Drawing Sheets

BASE PLATE WITH UNDULATION SHAPED SNAP-THROUGH HUB FOR DECREASED SWAGE FORCE ATTACHMENT OF SUSPENSION ASSEMBLY IN HARD DISK DRIVE

CROSS-REFERENCE TO RELATED APPLICATION

This application is a continuation of application Ser. No. 09/030,598 filed Feb. 25, 1988 now abandoned, and is related to application Ser. No. 08/943377, filed Oct. 3,1997, U.S. Pat. No. 6,067,729, on behalf of Steve Braunheim, et al. entitled "Base Plate For Magnetic Head Suspension In Hard Disk Drive With Material Fold-Over", application Ser. No. 09/003,871 filed Jan. 7, 1998, now abandoned, on behalf of Ryan Schmidt, et al. entitled "Base Plate With Pronged Hub For Press-In Attachment Of Suspension Assembly In Hard Disk Drive"; application Ser. No. 09/002,068 filed Jan. 7, 1998, now abandoned, on behalf of Ryan Schmidt, et al. entitled "Base Plate With Toothed Hub For Press-In Attachment Of Suspension Assembly In Hard Disk Drive"; and, application Ser.No. 09/003,872 filed Jan. 7, 1998, U.S. Pat. No. 6,141,868, on behalf of Ryan Schmidt, et al. entitled "Method And Apparatus For Press-In Attachment Of Suspension Assembly In Hard Disk Drive" all assigned to the same assignee as the present invention, which applications are incorporated herein by reference.

BACKGROUND OF THE INVENTION

1. Field of the Invention

This invention relates to disk head assemblies for supporting read/write heads adjacent rotating disks in disk drives and more particularly, to a base plate for attaching a head suspension assembly to a head actuator arm.

2. Description of the Prior Art

In hard disk drives data are stored on magnetizable surfaces of a plurality of rotatable disks that are mounted in a coaxial stack on a housing of the drive. Transducer heads that write data to and read data from the disk surfaces are supported by an actuator that is mounted on the housing and can be actuated to position the transducer heads in alignment with concentric data tracks defined on the disks. Each transducer head is attached to one end of a head suspension that is connected to an actuator arm that extends from the actuator body. The suspensions include a flexible load beam constructed of light sheet steel that has a bend formed in it. The load beam acts as a spring that forces the head against the disk surface with an accurate pre-load or "gram load". Air turbulence caused by the rotating disks lifts the heads slightly off of the disks so that the heads fly on an air bearing across the disk surfaces. The air bearing force is counteracted by the suspension gram load.

The head suspension is attached to an actuator arm using a base plate that forms a part of the head suspension. The base plate includes a flat flange portion and a cylindrical hub portion or boss. The base plate hub is passed through a load beam clearance hole and the flange is spot welded to the load beam. Alternatively, the hub and load beam clearance hole are aligned and the flange is welded on the opposite side. The combined base plate, load beam and a flexure make up the head suspension, and the suspension has the hub of the base plate extending beyond the load beam and concentric with the clearance hole.

The hubs of the suspensions are inserted into actuator arm boss holes formed through actuator arms extending from an actuator body. In the middle actuator arms, the hubs of two suspensions enter the arm boss hole from each end of the hole, so that the transducer heads of the suspensions face in opposing directions. A swage ball is passed through the concentric cylindrical hubs and boss holes to force the peripheries of the hubs to expand (swage) into tight engagement with the inner peripheries of the actuator arm boss holes.

Problems with this method of mounting transducer heads have arisen as the need for increased data storage capacity in hard disk drives has grown and the size of the disk drive has decreased to fit in small lap top computers. The problem of forming a strong connection between the actuator arms and the transducer suspensions has been made more difficult as the size of the components has become smaller. In the prior art, relatively high swaging forces are needed to insure that a base plate makes a strong connection with the actuator arm boss hole. As the part get smaller and thinner, these high forces cause unacceptable large distortions in the load beam and pre-load changes.

It is therefore an object of this invention to provide a base plate that reduces pre-load change caused by the swaging process.

SUMMARY OF THE INVENTION

Briefly, the invention is concerned with a base plate for fitting into a boss hole of a predetermined nominal diameter. The base plate comprises a flange and a hub extending from a region at which the hub meets the flange to an outer end of the hub. The hub has a number of arcuate indentations in the hub extending from the outer end of the hub part way or all the way to the region at which the hub meets the flange. The base plate can be used in a swaging operation or in a press-in operation. During a swaging operation the indentations amplify the expansion forces from the swage tool to engage the boss hole and can achieve snap-through shape change for permanent locking. For a press-in fit the diameter of the hub is greater than the nominal diameter.

The invention has the advantage that the unique base plate geometry increases outward boss expansion and decreases required swage force and associated gram load changing drag down.

The invention has the advantage that gram load change inherent in swaging is reduced and a large retention torque can be created even in a low hub height configurations that offer limited retention torque in a standard hub geometry.

The invention also has the advantage that the base plate reduces the large stresses and deformations associated with high swaging forces that result in gram load change.

BRIEF DESCRIPTION OF THE DRAWINGS

The invention will be described in greater detail with reference to the drawings in which:

FIG. 1b is side elevation view of a base plate of FIG. 1a;

In these figures, similar numerals refer to similar elements in the drawing. It should be understood that the sizes of the different components in the figures may not be to scale, or in exact proportion, and are shown for visual clarity and for the purpose of explanation.

DETAILED DESCRIPTION OF THE INVENTION

Figure 1A:
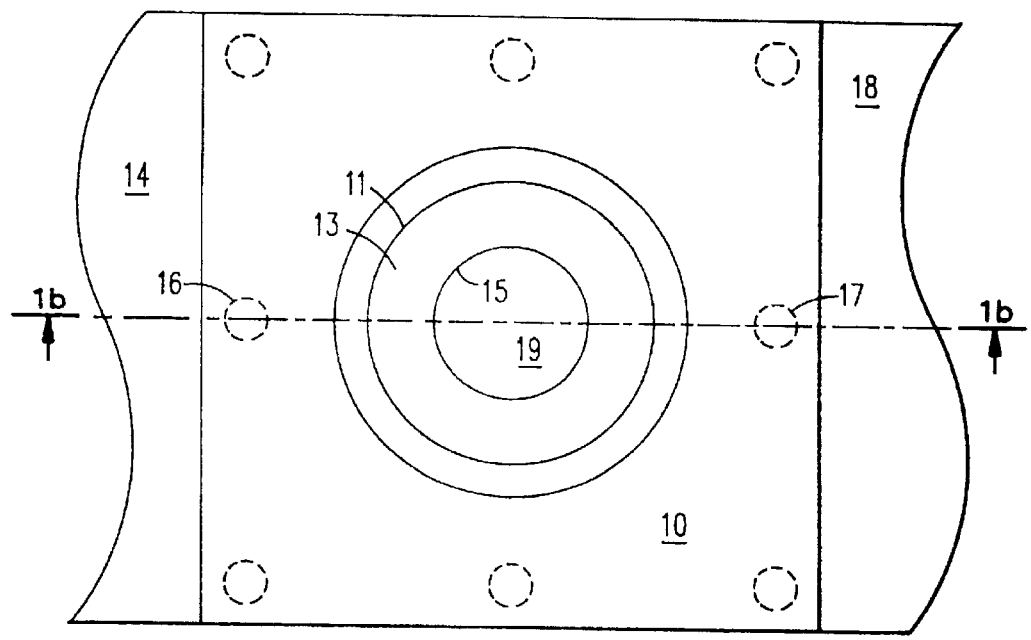
FIG. 1a is top view of a base plate of the prior art.
Figure 1B:
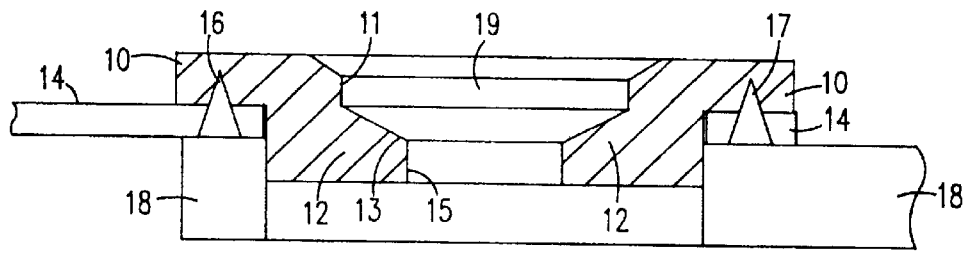

Refer to FIGS. 1a and 1b which illustrate a base plate of the prior art. An actuator arm and head suspension, which are elements of an actuator arm assembly, are connected end to end by the base plate. The base plate includes a flat flange portion 10 and a cylindrical hub portion or boss 12. A base plate typically has an inner barrel shape with a counter bore 11, a lead-in chamfer 13 and an inner diameter 15. The counter bore and inner diameter are perpendicular to the plane of the base plate flange 10. In assembling the suspension, the hub 12 is inserted through a load beam boss hole in a load beam 14, which is part of the suspension. The flange portion 10 is welded 16, 17, to the load beam. The hub is then inserted through an actuator arm boss hole in the actuator arm 18. The combined base plate, load beam and a flexure make up a head suspension, and the suspension typically has the hub of the base plate extending through and beyond the load beam clearance hole or alternatively the hub and load beam clearance hole are aligned and the flange is welded on the opposite side. A swage ball tool is passed through the center inner barrel 19 of the hub 12 causing pressure to be applied to cause the hub 12 to expand into the boss hole in the actuator arm, rigidly connecting the hub and attached load beam to the actuator arm boss hole.

Figure 2:
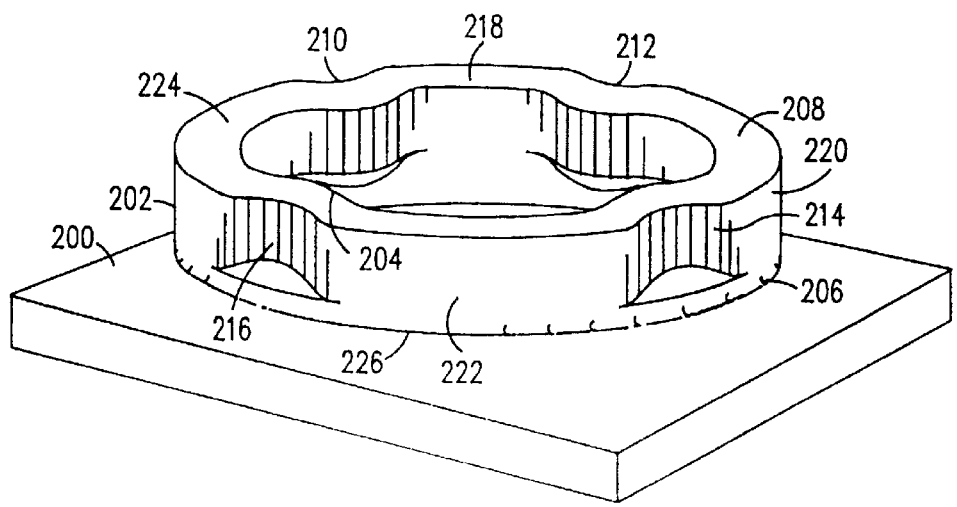
FIG. 2 is a perspective view of the base plate of the present invention.

Refer to FIG. 2 which illustrates a base plate of the present invention. The base plate includes a flat flange portion 200 and a cylindrical hub portion or boss 202. The unswaged hub has an inner barrel with an inner diameter 204. The inner diameter is perpendicular to the plane of the base plate flange 200. The hub extends from a region 206 at which the hub meets the flange to an outer end 208 of the hub. The unswaged hub has a number of vertical arcuate indentations 210, 212, 214, 216 pressed into the hub extending from the outer end 208 of the hub part way to the region 206 at which the hub meets the flange 200. The space between indentations determines boundaries of vertical columns is 218, 220, 222, 224. The diameter of the hub at an indentation formed into the hub is less than the nominal inner diameter 321 of the hub.

A corner relief groove 226 may be provided that circumscribes the region 206 at which the hub meets the flange. This relief helps reduce transmission of bending from the hub to the flange which would cause gram load change.

Figure 3A:
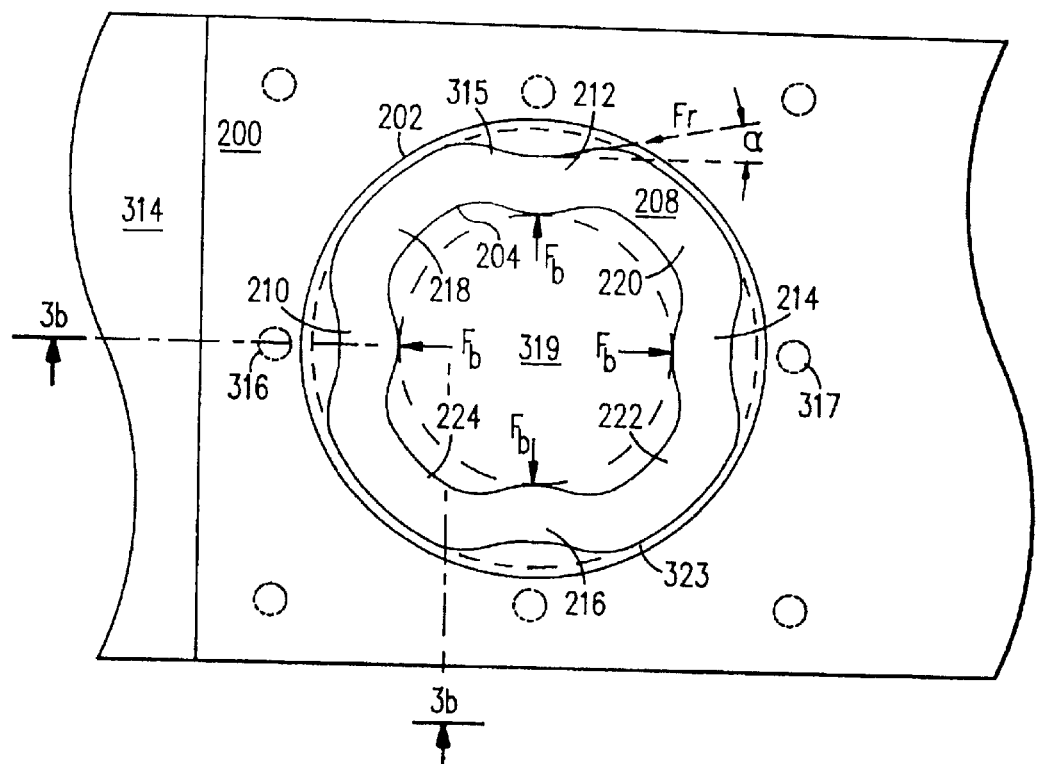
FIG. 3a is bottom view of the base plate of FIG. 2.
Figure 3B:
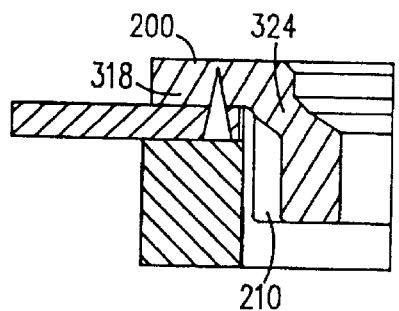
FIG. 3b is side elevation view of the base plate of FIG. 3a along the view line 3b—3b; and, FIG. 3c is a diagram illustrating force vectors generated in the base plate of FIG. 3a during the swaging operation.

Refer to FIGS. 3a and 3b which illustrate the base plate of FIG. 2. An actuator arm and head suspension, which are elements of an actuator arm assembly, are connected end to end by the base plate. The base plate includes a flat flange portion 200 and a cylindrical hub portion or boss 202. The unswaged hub has an inner barrel 319 with an inner diameter 204. The inner diameter is perpendicular to the plane of the base plate flange 200. One or more indentations 210, 212, 214, 216 are formed into the unswaged hub.

In assembling the suspension assembly, the unswaged hub 202 is inserted through a load beam clearance hole in a load beam 314. The flange portion 200 is welded 316, 317, etc. to the load beam. Alternatively, the hub and load beam clearance hole are aligned and the flange is welded on the opposite side. To create the actuator arm assembly, the unswaged hub is fitted in an actuator arm boss hole 321 in the actuator arm 318 and a swage ball is passed through the inner barrel 319. The unique hub configuration creates a very high expansion force with a small input force that the swage ball exerts on the inner sides of the hub. The smaller the angle α the more mechanical advantage is obtained. The minimum range is determined by how much expansion of the inner diameter is needed.

In one embodiment of the invention, the part takes a permanent set, without snap-through, with the swaged hub remaining in an expanded shape. A standard swage ball forced through the inner barrel 319 exerts a radial force $F_b$ at each of the inner diameter points wherein the broken line circle 321 touches the hub 218. If a high yield strength boss material is used, a swage ball pass could cause a snap-through shape change at the indentations, pushing them past the point of the highest compression, providing locking. In this embodiment of the invention, the hub configuration acts as a lever that provides a mechanical advantage to the boss expansion during swaging. This reduces the required swage force and resulting axial drag down force that causes gram load change at the load beam, yet providing good retention torque.

FIG. 3b is side elevation view of a base plate of FIG. 3a along the view line 3b—3b. The thin leg portion 324 of the hub decouples the expansion zone from the base plate flange 200 resulting in a reduction of gram load change due to swaging.

Figure 3C:
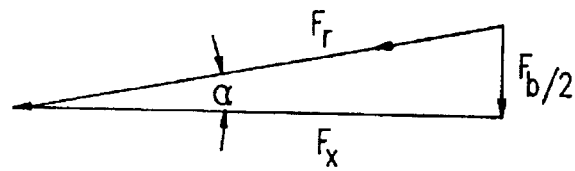

Refer to FIG. 3c which is a diagram illustrating force vectors generated in the base plate of FIG. 3a during the swaging operation. The following equation is evident from FIG. 3c:

$$F_r = F_b / 2 \sin \alpha$$

if if α=20 degrees $$F_r = F_b / 2 (2.92) \text{ i.e } 292\% \text{ amplification}$$

Wherein:

$F_b$ is the force transmitted from the swage tool to one of the extreme points on the inner indentation surfaces in the radial direction, and $F_r$ is the resultant or "hoop" force generated in the indentations 210, 212, 214, 216 due to the ball force $F_b$ that causes expansion.

It will be understood by those skilled in the art that the base plate may be fitted into the boss hole by either a swaging method or a press fitting method.

The swaging method entails clamping the actuator body in place in a fixture to prevent outward bending of the outermost actuator arms. A number of head suspension assemblies are placed in the actuator body such that base plate hubs in the suspensions are in vertical alignment with corresponding boss holes in actuator arms extending from the actuator body. The head suspension assemblies are radially aligned with a pin that passes through tooling holes in the distal end of the suspensions and into the fixture. A swage ball tool is passed through the center inner barrel of the vertically aligned hubs of the base plates causing pressure to be applied to cause the hubs to expand into the corresponding boss hole in the actuator arm, rigidly connecting each hub and attached load beam to the corresponding actuator arm boss hole.

The press fitting method entails inserting a tool between the actuator arms and in alignment with the base plates, and activating the tool a reach sufficient to urge each base plate hub into a corresponding boss hole for a press fit. The press fitting method is more fully described in the above-referenced copending application Ser. No. 09/003,872.

While the invention has been particularly shown and described with reference to preferred embodiments thereof, it will be understood by those skilled in the art that the foregoing and other changes in form and detail may be made therein without departing from the scope of the invention.

What is claimed is:

1. A base plate comprising:

a flange, and an unswaged one-piece hub contiguous with said flange, said hub having an outer surface;

said hub extending perpendicular to said flange and extending from a region at which said hub meets said flange to an outer end of said hub;

said hub having an inner barrel with a nominal diameter at said region at which said hub meets said flange;

said outer surface of said unswaged hub having a number of axial arcuate indentations formed into said outer surface and protruding radially inwardly from said hub outer surface beyond said inner barrel, an inner diameter of said barrel at said indentations being less than said nominal diameter, each indentation extending from said outer end of said hub to a point that is located between said outer end of said hub and said region at which said hub meets said flange.

2. The base plate of claim 1 wherein:

said indentation has a cross-sectional shape in the form of an undulation.

3. The base plate of claim 2 wherein said indentation formed into said hub extends from said outer end of said hub to said region at which said hub meets said flange.

4. The base plate of claim 3, further comprising a corner relief groove that circumscribes the region at which said hub meets said flange and reduces transmission of bending from the hub to the flange.

5. The base plate of claim 2, further comprising a corner relief groove that circumscribes the region at which said hub meets said flange and reduces transmission of bending from the hub to the flange.

6. The base plate of claim 1, further comprising a corner relief groove that circumscribes the region at which said hub meets said flange and reduces transmission of bending from the hub to the flange.

7. A base plate comprising:

a flange, and an unswaged hub extending from a region at which said hub meets said flange to an outer end of said hub, said hub having an inner barrel;

said unswaged hub having a number of indentations formed into said hub protruding radially inwardly beyond said inner barrel, each indentation extending from said outer end of said hub to a point that is located between said outer end of said hub and said region at which said hub meets said flange.

8. The base plate of claim 7 wherein:

an indentation has a cross-sectional shape in the form of an undulation.

9. The base plate of claim 8, further comprising a corner relief groove that circumscribes the region at which said hub meets said flange and reduces transmission of bending from the hub to the flange.

10. The base plate of claim 7, further comprising a corner relief groove that circumscribes the region at which said hub meets said flange and reduces transmission of bending from the hub to the flange.

11. A base plate for press fitting into a boss hole of a predetermined nominal diameter comprising:

a flange, and, a hub contiguous with said flange, said hub being perpendicular to said flange and extending from a region at which said hub meets said flange to an outer end of said hub, said hub having an inner barrel, an outer diameter of said hub being greater than said nominal diameter;

said hub having a number of indentations formed into an outer surface of said hub, said indentations protruding radially inwardly beyond said inner barrel of said hub;

each said indentation formed into said hub extending from said outer end of said hub to a point that is located between said outer end of said hub and said region at which said hub meets said flange.

12. The base plate of claim 11 wherein:

said number of indentations have cross-sectional shapes in the form of an undulation.

13. The base plate of claim 12, further comprising a corner relief groove that circumscribes the region at which said hub meets said flange and reduces transmission of bending from the hub to the flange.

14. The base plate of claim 11, further comprising a corner relief groove that circumscribes the region at which said hub meets said flange and reduces transmission of bending from the hub to the flange.

* * * * *